United States Patent
McChesney (10) Patent No.: US 9,650,156 B2
(45) Date of Patent: May 16, 2017

(54) PIN ARRAY CHAMBER SYSTEMS AND METHODS FOR RELEASING AND CAPTURING MOVING OBJECTS

(71) Applicant: Jeffrey Alan McChesney, Ridgefield, CT (US)

(72) Inventor: Jeffrey Alan McChesney, Ridgefield, CT (US)

( * ) Notice: Subject to any disclaimer, the term of this patent is extended or adjusted under 35 U.S.C. 154(b) by 278 days.

(21) Appl. No.: 14/554,973

(22) Filed: Nov. 26, 2014

(65) Prior Publication Data
US 2016/0229557 A1  Aug. 11, 2016

(51) Int. Cl.
*B64F 1/02* (2006.01)
*B64D 5/00* (2006.01)
*B64C 39/02* (2006.01)

(52) U.S. Cl.
CPC ............... *B64F 1/02* (2013.01); *B64D 5/00* (2013.01); *B64C 39/024* (2013.01); *B64C 2201/141* (2013.01); *B64C 2201/146* (2013.01); *B64C 2201/182* (2013.01)

(58) Field of Classification Search
CPC ...... B64F 1/02; B64F 1/04; B64F 1/22; B64F 1/222; B64C 2201/08; B64C 2201/18; B64C 2201/182; B64G 1/002; B64G 5/00; B64G 2005/005; B64D 5/00
See application file for complete search history.

(56) References Cited

U.S. PATENT DOCUMENTS

| | | | |
|---|---|---|---|
| 1,499,472 A | 7/1924 | Pratt | |
| 2,754,708 A * | 7/1956 | Peterson | B25B 1/2421 269/224 |
| 2,939,657 A * | 6/1960 | Westcott, Jr. | B64F 1/04 114/261 |
| 3,612,484 A * | 10/1971 | Gallagher | B64F 5/0036 254/2 R |
| 4,536,980 A | 8/1985 | Fleming | |
| 4,572,564 A * | 2/1986 | Cipolla | B25B 1/2421 269/266 |
| 5,011,207 A * | 4/1991 | Stevens | B25J 15/106 294/119.1 |
| 5,054,717 A | 10/1991 | Taylor | |
| 5,407,185 A * | 4/1995 | Zehnpfennig | B25B 1/2421 269/266 |
| 5,906,336 A | 5/1999 | Eckstein | |

(Continued)

FOREIGN PATENT DOCUMENTS

EP   1 370 461 B1   9/2014
GB   WO 02076826 A1 * 10/2002 ........... B64C 39/024

(Continued)

*Primary Examiner* — Tien Dinh
*Assistant Examiner* — Alexander V Giczy (57) ABSTRACT

An unmanned aerial vehicle (UAV) pin array release and capture chamber system includes a chamber assembly having two parallel plates of pin arrays from which a plurality of pins extend and retract vertically opposite each other so as to release and capture a UAV. The pin arrays are separated from each other by a space having two vertical and two horizontal sides, and the space is sized so as to receive the UAV. Each pin arrays may be housed in a pin array chamber enclosure. The chamber assembly may be attached to a moving object, such as an aircraft, or may be stationary with respect to a ground surface.

5 Claims, 7 Drawing Sheets

(56) References Cited

U.S. PATENT DOCUMENTS

| | | | |
|---|---|---|---|
| 6,298,587 B1 | 10/2001 | Vollum | |
| 6,869,042 B2 | 3/2005 | Harrison | |
| 7,143,976 B2 | 12/2006 | Snediker | |
| 7,219,856 B2 | 5/2007 | Watts | |
| 7,290,761 B2 * | 11/2007 | Siegel | B25B 1/08 269/266 |
| 7,410,125 B2 | 8/2008 | Steele | |
| 7,510,145 B2 | 3/2009 | Snediker | |
| 7,798,445 B2 | 9/2010 | Heppe | |
| 8,028,952 B2 | 10/2011 | Urnes | |
| 8,038,090 B2 | 10/2011 | Wilson | |
| 8,066,270 B2 * | 11/2011 | Siegel | B25B 1/2421 269/272 |
| 8,276,844 B2 | 10/2012 | Kariv | |
| 8,375,837 B2 | 2/2013 | Goossen | |
| 8,439,301 B1 | 5/2013 | Lussier | |
| 8,534,728 B1 * | 9/2013 | Bosscher | B25J 15/106 269/266 |
| 8,567,718 B1 | 10/2013 | McDonnell | |
| 2005/0186055 A1 * | 8/2005 | Hyatt | B64F 1/227 414/427 |
| 2013/0082137 A1 | 4/2013 | Gundlach | |
| 2013/0341462 A1 | 12/2013 | Jacobs | |
| 2014/0117147 A1 * | 5/2014 | Hanna | B64C 39/024 244/2 |
| 2016/0011592 A1 * | 1/2016 | Zhang | B64C 39/024 701/2 |
| 2016/0347192 A1 * | 12/2016 | Lee | B64C 39/024 |

FOREIGN PATENT DOCUMENTS

| | | | | |
|---|---|---|---|---|
| GB | EP 1370461 A1 * | 12/2003 | | B64C 39/024 |
| KR | 20160009446 A * | 1/2016 | | B64C 39/024 |

* cited by examiner

FIGURE 3 (Front View)

Aft View

FIGURE 6A

Front View

FIGURE 6B

PIN ARRAY CHAMBER SYSTEMS AND METHODS FOR RELEASING AND CAPTURING MOVING OBJECTS

FIELD OF THE INVENTION

The present disclosure relates to pin array chamber systems and methods for releasing and capturing moving objects

BACKGROUND

Humans have used many release and arresting systems throughout history, to include nets for fishing, and snares for hunting, leading to harpoons, spears, ropes, and myriad other means to capture a desired moving object. Most prior art is concerned with capturing a moving object, with little regard to avoid harming the target, and even fewer contemplating later release as well. As reusable devices proliferated in the $19^{th}$, $20^{th}$ and $21^{st}$ centuries, the need for release systems increased ever so slightly. With the advent of autonomous moving objects, that are reusable, the need increased dramatically, with few precedent systems to solve very high speed capture without destroying the moving object. One subset of moving objects, unmanned aerial vehicles (UAV), had initial technology focused on landing and take-off to runways with remotely piloted or autonomous control. With the advent of precision relative navigation allowing moving objects to align very accurately with a specific point in space relative to another object, non-destructive systems are increasingly useful for capturing and releasing moving objects.

Historical attempts for launch and recovery systems, excluding runway and aircraft carrier landings, for manned and unmanned UAV fall into two categories of hosts. The first is a slow-speed or stationary host (such as a naval vessel or army truck or ground stand), or a high-speed host (such as another UAV, a Bomber or Cargo aircraft). The former have been somewhat successful with netting and hooking solutions, even though UAVs are sometimes harmed or destroyed in the process, while the latter have been largely unsuccessful (with aerial refueling being the primary success).

In high-speed host cases, launch and recovery solutions are largely constrained by these factors: relative positioning navigation technology; timing of release and capture; aerodynamic interference between the aerial vehicle and the host; and structural issues and weight, compounded in most cases by speed differentials and ensuing force loads between the aerial vehicle and the launch/recovery vehicle.

While many attempts at launch and recovery of aircraft with a host have been envisioned, none have proven practicable at overcoming the four constraints above, simultaneously. For example, the Fighter Conveyor (FICON) program in the late 1940s produced the XF-85 Goblin fighter aircraft for internal carriage to a B-36. This trapeze and hook system attempted to use a manned parasite fighter to overcome the four constraints above. Relative positioning was accomplished with a man in the loop, the timing of capture and release was solved by a trapeze and hook design, but the aerodynamic and structural issues were problematic. In fact, even after an inflight collision and redesign, the FICON program was cancelled because it caused more problems than it solved. The costs outweighed the benefits in the final analysis, even if safety could have been assured. The key problem identified in the FICON program, as well as other examples since, highlights the very real problems around recovery operations between to moving objects. Dramatic modifications and trade-offs to the aircraft and host have been required to achieve safe, repeatable, reliable recovery. Complexity, both in design and operational concepts, and untenable weight growth ensued.

BRIEF SUMMARY OF THE INVENTION

The invention is an unmanned aerial vehicle (UAV) pin array release and capture chamber system includes a chamber assembly having two parallel plates of pin arrays from which a plurality of pins extend and retract vertically opposite each other so as to release and capture a UAV.

DETAILED DESCRIPTION

A. Overview

This disclosure focuses on a capture and release system using a pin array; thereby allowing graceful and non-destructive clamping of a moving object. In particular, the system disclosed specifically solves the four constraints mentioned above in a novel and useful method. The Pin Array Chambering System (PACS) is generally agnostic to host platforms or the moving objects that need to be captured and released, as long as the moving object can be positioned between the pin arrays so that sufficient clamping force can be applied, without causing damage to either the host or the moving object.

The PACS uses known technology components combined into a new system and method, such as springs, pins and plates. In the described embodiment for UAV capture by another aircraft, to achieve high-volley rates for launch and recovery, PACS is in many ways analogous to rifles and gatling guns, depending on which variations for the chambering and feed mechanisms are designed. In essence, PACS can consider each UAV as a round that needs to be fed, chambered and launched; but unlike a rifle, subsequently captured and reused.

Another aspect of the disclosure is its applicability with systems and methods for use in other gas and liquid mediums, including the vacuum of space. The PACS method can be used in the medium of air, on the surface of water, underwater, or anywhere in the vacuum of space across the entire universe, including all others gases and liquids, or mixtures thereof. Examples include, but are not limited to, releasing and capturing manned and unmanned vehicles by naval ships at rest and moving through water, above and below the surface; ground vehicles or stands at rest and moving across terrain, and space ships or vehicles moving through the vacuum of space, whether in orbit or not.

PACS benefits are numerous to the prior art. Due to its graceful release and capture, no structural modifications to existing UAVs are required. No modifications to existing host external designs are required, since it is designed for under-wing to existing hard-points, bomb-bay stowage or for cargo bays. PACS also provides high cycle rates for release and capture, enabling large volleys of UAVs to be deployed. PACS is more reliable, repeatable, simple, flexible, scalable, programmable and efficient than other UAV capture systems.

Many specific details of certain embodiments of the disclosure are set forth in the following description and in FIGS. 1-6 to provide an informed understanding of the system and methods. Well known structures, systems and methods associated with such systems are not shown or described in detail to avoid unnecessarily obscuring this disclosure. As a result, those with ordinary skill in the disclosed art will infer that additional embodiments may be practiced without several of the details described below.

B. Embodiments of Pin Array Chamber Systems and Methods for Releasing and Capturing Moving Unmanned Aerial Vehicles (UAV)

Figures 1A, 1B, 1C:
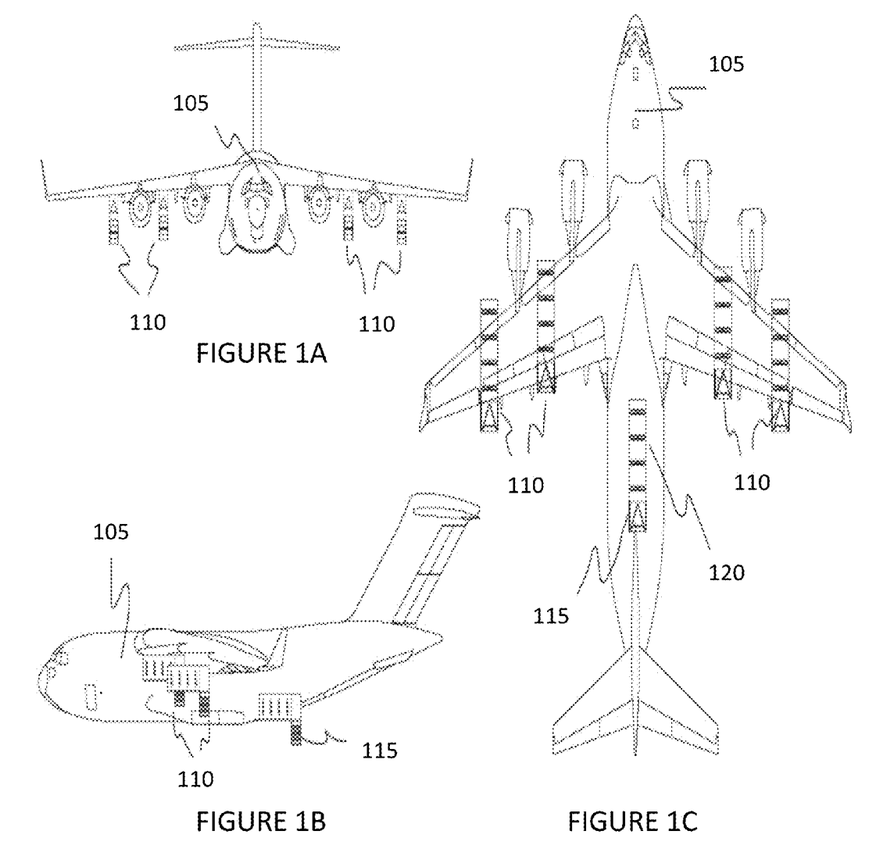
FIG. 1 depicts an aircraft illustration as the host of a pin array system with the pin array chamber system open to the airstream in accordance with an embodiment of the disclosure.

FIG. 1 depicts an aircraft illustration as the host of a pin array system with the pin array chamber system open to the airstream for capture and release of a UAV. Aircraft 105 is the host aircraft with elements 110 as wing-stationed pin arrays for one embodiment, while element 115 is another embodiment of the PACS deployed from the cargo door of a typical military cargo aircraft. In one embodiment, the PACS in element 110 or 115 is attached to a storage, feed and control mechanism 120, which allows for loading and unloading UAVs into the pin array chamber system. Storage, feed and control mechanism 120 can be used with each PACS as another embodiment, allowing for conveyor handling of UAVs.

Figure 2A:
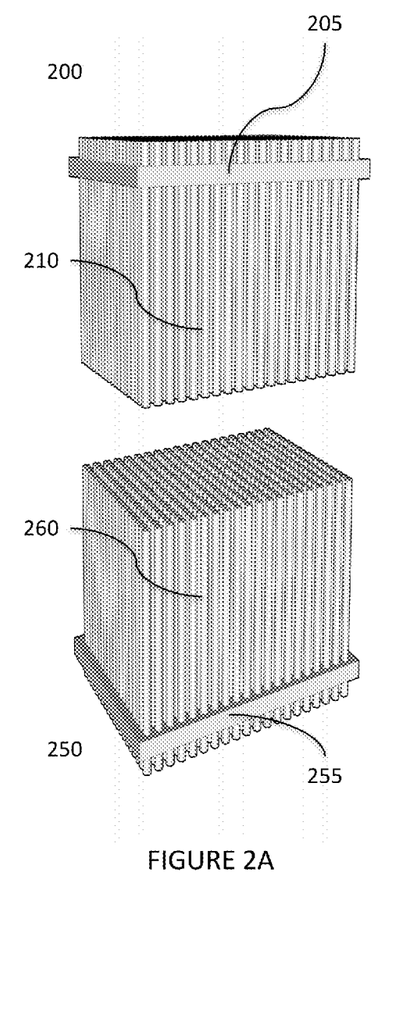
FIG. 2 depicts the pin array chamber system with multiple pins protruding from two opposing plates.
Figure 2B:
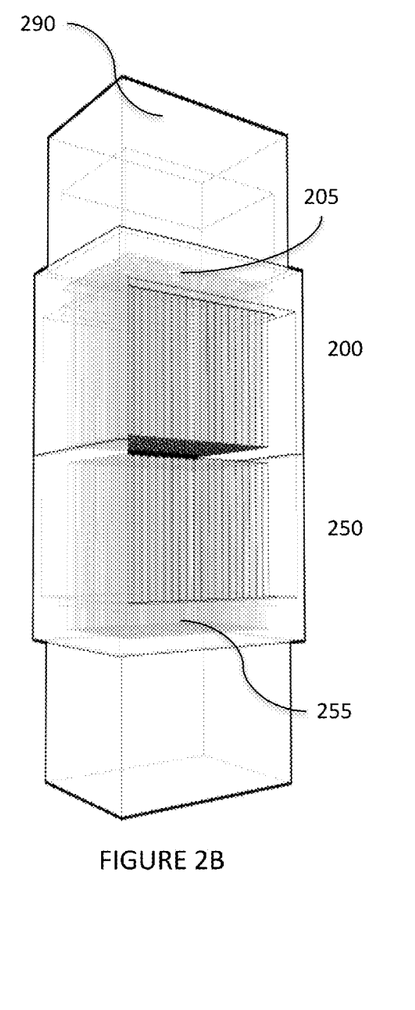

FIG. 2 depicts a pin array chamber mechanism, consisting of two opposing arrays 200 and 250, which are perpendicular to one another. Concerning array 200, holding plate 205 has one or more holes, of varying shapes, but depicted here as circular, allowing one or more pins 210 to extend and retract through plate 205. The thickness of plate 205 may vary, and there may be additional plates 205 along the longitudinal axis of the pin array, to provide additional stabilization and control of pins 210. In this embodiment, each pin 210 is of equal length, but may be of equal or varying lengths for other embodiments. Each pin 210 is extended or retracted through plate 205 by applying a longitudinal force comprising electro-mechanical, mechanical, spring, hydraulic or other means, which are not shown, but which one skilled in the relevant art can infer. This force can be applied, or not applied, to each pin 210 individually or equally to all pins 210 of array 200, if there is more than 1 pin. In the depicted embodiment, array 250 is an exact duplicate of array 200, including the force methods disclosed, but in an opposing orientation of 180 degrees, so that each pin 210 has an opposing pin 260. In other embodiments, the number, size, shape, force and alignment of opposing pins 260 of array 250 may be different, but they still apply an opposing force along the longitudinal axis of pins 260. An outer housing 290, of various materials and thickness, depicts one method for holding opposing array 200 and array 250 in position to one another. In this embodiment, pins from array 200 and 250 are retracted into a closed housing 290, above plate 205 and below plate 255. In another embodiment, the housing may only be the structural elements of the PACS, without any enclosure skin.

Pins 210 and 260 may be of varying materials, thickness and strength. In addition, pins 210 and 260 in this embodiment are uniform from end to end. In other embodiments, they may not be uniform and may include any material or combination of materials, such as rubber, rollers, or even ball-bearings as tips that will come in contact with the UAV or moving object. Other embodiments may include other tip materials and mechanisms to minimize damage upon contact with a moving object or to facilitate easier handling of the object once captured.

The opposing pins 210 and pins 260, of array 200 and array 250, respectively, apply opposing pin force in opposite longitudinal directions. In this embodiment, Plate 205 and plate 255 are separated at the combined extended length of pin 210 and pin 260, so that an object between them will displace the respective pins. As a result, the opposing forces of pins 210 and pins 260 provide a clamping motion of any object that is placed in between. Other embodiments may separate the two plates at greater or less than the combined extended length of the two pin arrays.

Another embodiment of the system and method may include a plurality of sets of pin array chambers in combination working along the same longitudinal axes as arrays 210 and 250, or other axes. As a further embodiment, another set of two pin arrays could operate 90 degrees rotated to a lateral axis from arrays 210 and 250; thereby creating a clamping force from four perpendicular directions into the same chamber space.

Figure 3:
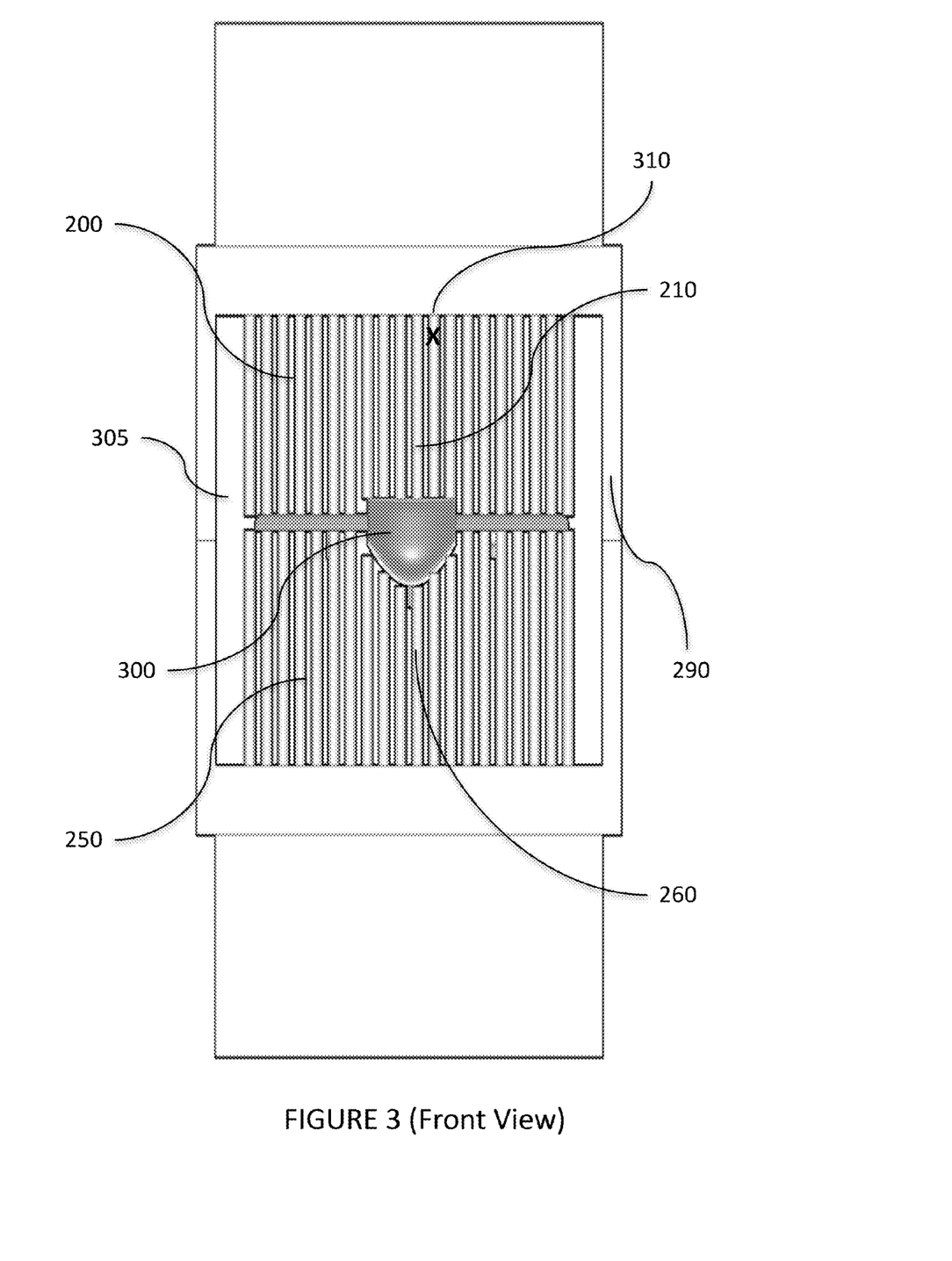
FIG. 3 depicts an unmanned aerial vehicle (UAV) captured within the pin array chamber system

FIG. 3 depicts an unmanned aerial vehicle (UAV) 300 within the pin array chamber system 305 from a front view. In this embodiment the UAV is held in place by the clamping forces supplied in opposing directions from pins 210 and pins 260, from pin arrays 200 and 250, respectively. The pins 210 and pins 260 supply minimal forces individually so as not to harm the UAV, but a plurality of pins provide a sufficient clamping force to hold the UAV in position, even against any gas dynamic forces, such as drag, being exerted laterally on the UAV. As shown in FIG. 3, the extensions of pins 210 and pins 260 against the outer skin of the UAV creates an impression of pins that follows the contours of the UAV precisely. These pin contours provide additional resistance to lateral forces. Each pin 210 and pin 260 is constructed of sufficient material, such as aluminum, so they are structurally held within plate 205 and 255, or a plurality of plates, not shown, without any substantial lateral deformation to the pins from the lateral forces from drag. The net effect of extended pins 210 and pins 260 by pin array 200 and pin array 250 is a capture chamber that can conform to whatever shape comes between the arrays. In this embodiment, the PACS method allows innumerable UAV sizes and shapes to be captured between the pin arrays. The PACS chamber 305 that captures and holds the UAV is permeable to the lateral slipstream 310 of the air that passes through it, since the extended pins plus the UAV do not take up the entire volume of the Chamber 305. Chamber 305 is the inside volume between plate 205, plate 255 and both sides of the enclosure 290. Lateral slipstream 310 is depicted as an X within chamber 305, indicating the airflow is going directly into the entire area of chamber 305. In this embodiment, the aerodynamic drag is much reduced compared to a closed chamber that would not allow the air to pass through and around the pins and the UAV. In another embodiment in the vacuum of space, since no gas or liquid medium exists, the considerations of drag and lateral flow of the slip-stream is moot, although the direction of travel remains.

In other embodiments, the UAV could be held in place by a plurality of pin arrays from a plurality of directions. In these cases, the pin arrays may have a plurality of distances between the opposing arrays at full pin extensions, and all pins would extend to their designed length unimpeded by other pins.

Figure 4:
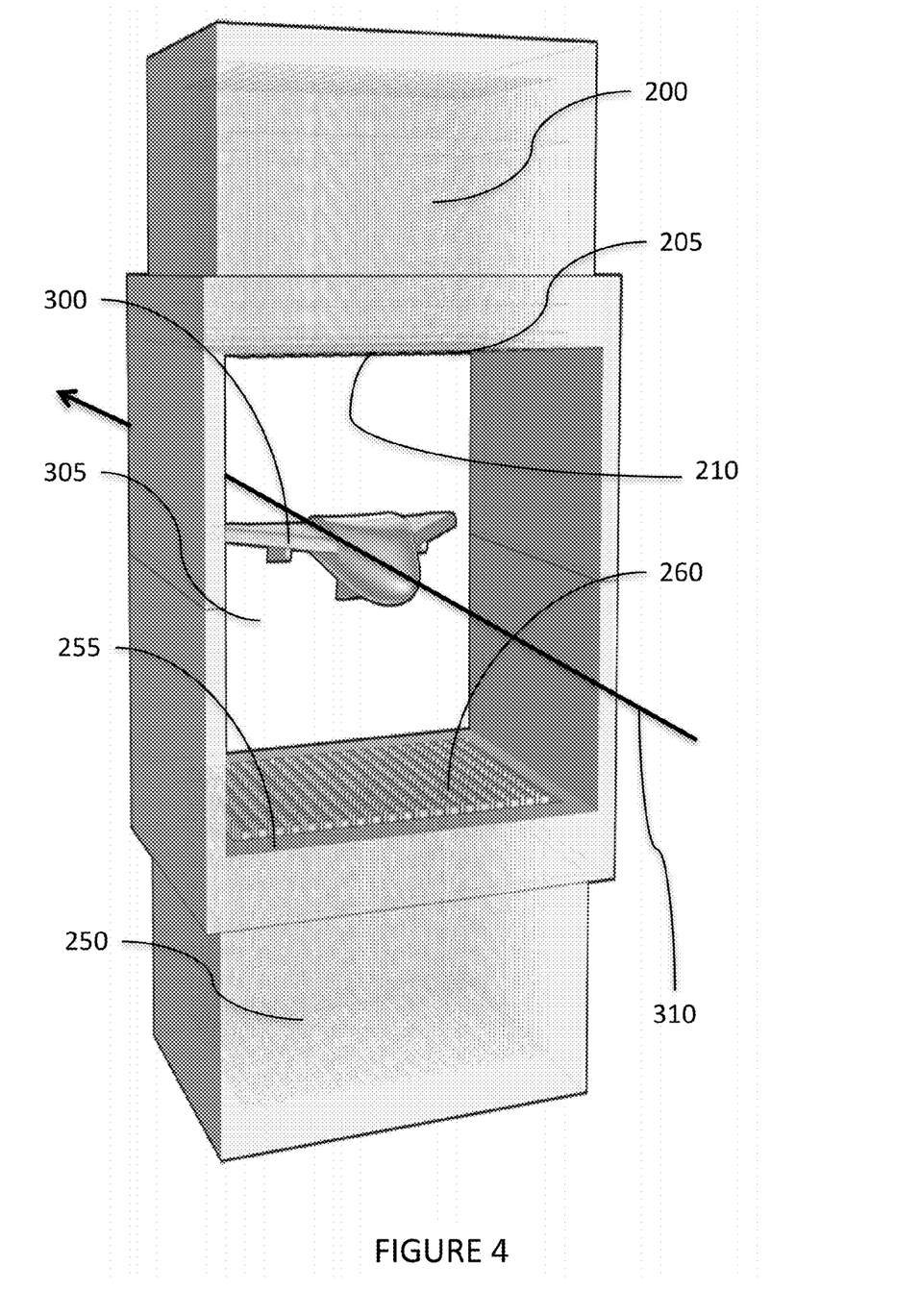
FIG. 4 depicts an unmanned aerial vehicle (UAV) released, in free flight, positioned within the pin array chamber system

FIG. 4 depicts an unmanned aerial vehicle (UAV) 300 being released, in free flight, positioned within the pin array chamber system 305. The pin array 200 and pin array 250 have retracted their pins 210 and pins 260, by reversing the longitudinal force along each pin, pulling each pin back through plate 205 and plate 255, respectively. In this embodiment, the UAV is at the correct power setting to sustain flight within the chamber 305, at the time of pin retraction. As a result, after the pins are retracted, the UAV maintains its precise relative position, under its own power, within the lateral slipstream 310. Once the pins are retracted, the UAV is free to fly forward or in reverse to leave the PACS. In another embodiment, the UAV 300 may be unpowered or not powered enough for flight to maintain precise relative position within chamber 305.

Figure 5A:
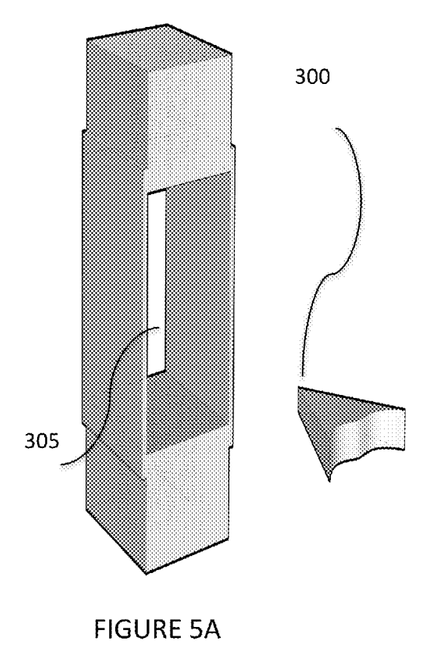
FIG. 5 depicts a free-flight unmanned aerial vehicle (UAV) approaching the pin array chamber and stopping within the chamber.
Figure 5B:
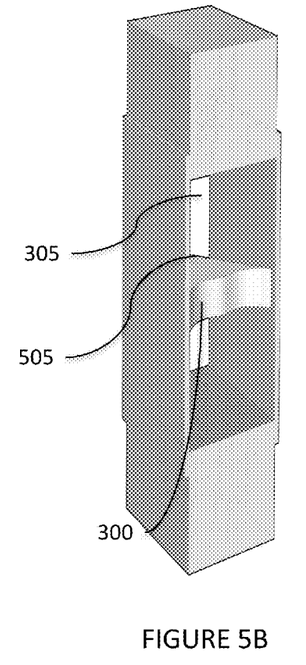

FIG. 5 depicts a free-flight unmanned aerial vehicle, UAV 300, approaching the pin array chamber 305 and stopping within the chamber. The pins 210 and pins 260, not shown, are fully retracted by reverse longitudinal clamping forces previously mentioned, or in another embodiment, by the removal of those forces, such as spring tension. The pins depicted are by default in the retracted position. In other embodiments, a pin 210 or pin 260 may be extended to varying lengths before or as the UAV 300 approaches the chamber 305. In this embodiment, the UAV 300 uses autonomous precision relative navigation to move to a precise contact point 505 within the chamber 200. This precise contact point 505 is an optimal computed location, in 3 dimensional space, for the UAV 300 to stop and be captured. In other embodiments, the moving object may be flown by a man onboard or remotely piloted.

Figure 6A:
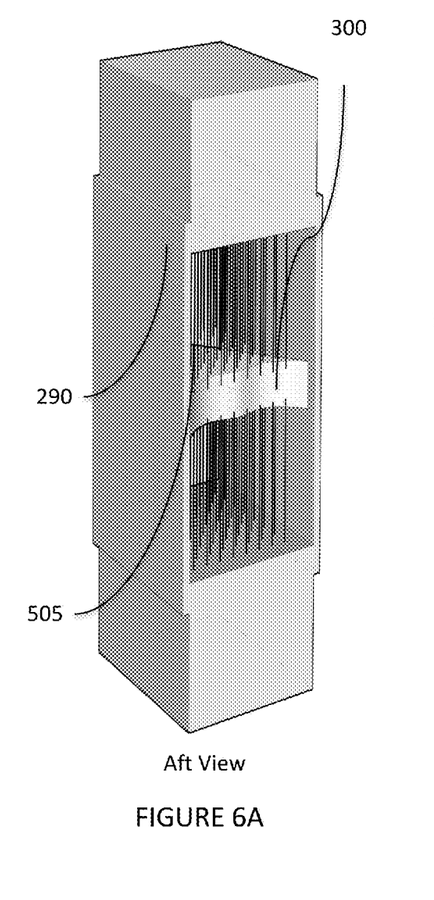
FIG. 6 depicts the pin array chamber system extending the pins with a clamping force to capture the UAV
Figure 6B:
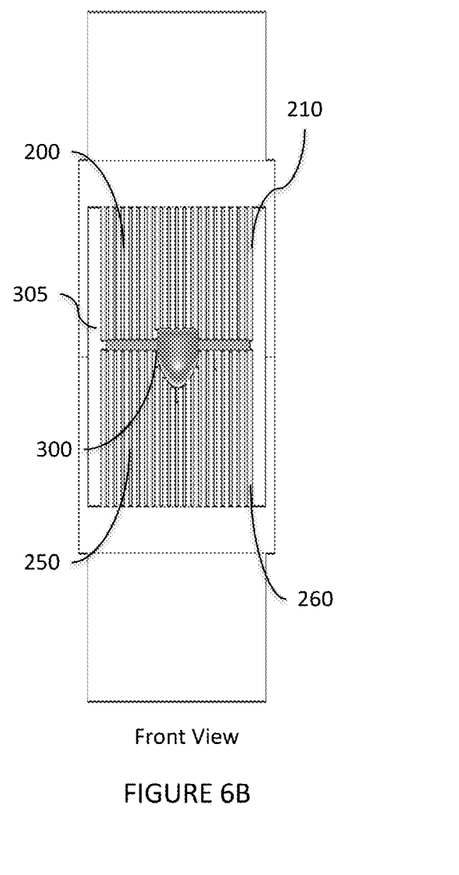

FIG. 6 depicts the pin array chamber system extending the pins 210 and pins 260 from opposing array 200 and array 250, with a clamping force to capture the UAV 300. In this embodiment, UAV 300 has stopped in a precise contact point 505 within the pin array chamber 305, matching the speed of the UAV 300 and the pin array chamber enclosure 290, which is attached to the host aircraft. In other embodiments, the host may be stationary or at a different speed than the moving object, and the moving object is then captured. These latter embodiments may utilize a plurality of pin tips and materials to reduce the lateral forces to the pins and minimize forces and friction to the moving object. In yet another embodiment of a stationary host capturing a moving object, pin array 200 and pin array 250 may asynchronously extend pins 210 and pins 260 along the lateral direction of the moving object as it enters the pin array chamber 305. In that manner, the clamping motion is gracefully applied to the moving object as it decelerates without causing any undue harm to the moving object.

Figures 7A, 7B:
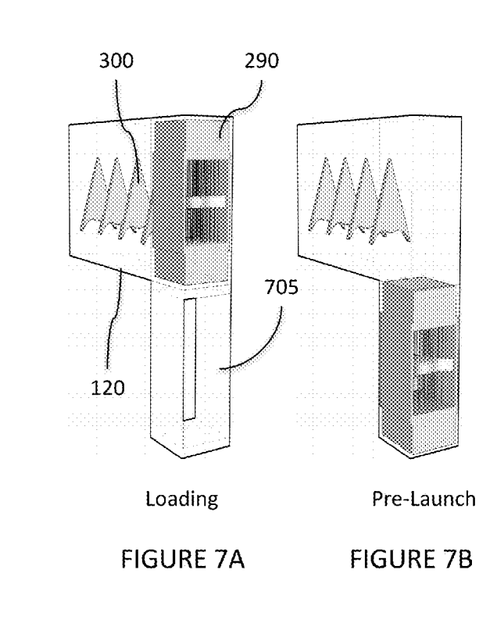
FIG. 7 depicts one embodiment of the PACS attached to a Storage, feed and control mechanism 120. It depicts 4 sequential stages: Loading, Pre-Launch, Launch and Free Flight.
Figure 7C:
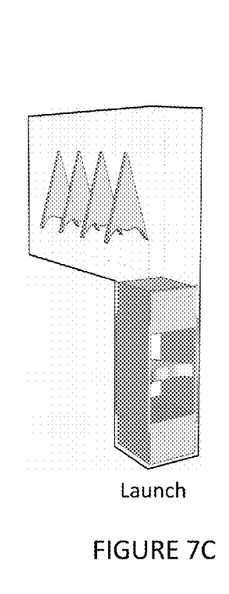
Figure 7D:
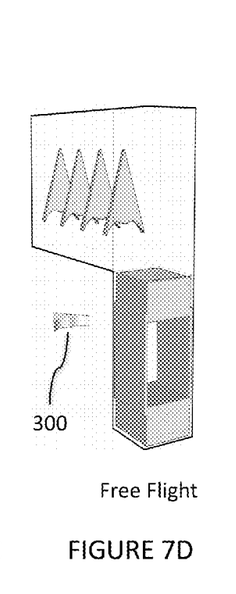

FIG. 7 depicts one embodiment of PACS attached to a Storage, feed and control mechanism 120 previously disclosed in FIG. 1. The PACS is an integral part of a larger system to launch and recover multiple UAV 300s. As shown, in the first stage Loading, UAV 300 is moved via Storage, feed and control mechanism 120 to the PACS enclosure 290 and its various components previously mentioned in the previous Figures. As shown in FIG. 1, the Storage, feed and control mechanism 120 has Launch chamber 705, shown in the open position. In the Pre-Launch stage, the UAV 300, within PACS enclosure 290, is then moved down into the Launch chamber 705 by various methods and mechanisms that one possessing ordinary skill in the relevant art can design. In the Launch stage, the UAV 300 is released from PACS by systems and methods previously disclosed. In the Free Flight stage, the UAV 300 moves away and the PACS is available for additional launch or recovery operations.

A. Additional Embodiments of Pin Array Chamber Systems and Methods for Releasing and Capturing Moving Objects Additional embodiments of pin array chamber systems and methods for releasing and capturing moving objects include capturing and releasing manned vehicles or UAVs from a surface or submerged naval vessel, such as an unmanned underwater drone for mapping ocean floors. Another embodiment is for space docking in a vacuum, which removes the requirement for heavy and complex docking clamps on every manned vehicle. Instead a pin array chamber could dock any space faring vehicle, and allow for soft and flexible connections to be made for transfers of people or supplies. Another space embodiment is for capture and release of space vehicles that were not designed to be captured, such as satellites, again obviating the need for complex singular use designs for every vehicle contemplated. The space embodiment also allows for repositioning satellites upon release.

While the aforementioned embodiments disclose larger and visible systems and methods, additional embodiments occur at much smaller sizes, even well below what is visible to the naked eye, utilizing the same clamping force from a pin array. For those with ordinary skill in the relevant art, the pin array chamber system and method can be used down to the microscopic, molecular, and even atomic levels. At these sizes, pin array chamber clamping forces can also be used to capture moving objects, such as within a blood vessel for medicinal purposes, or as part of scientific research for capturing cells or specific molecules or atoms. Medicine, chemistry and physics, while not all inclusive of possible disciplines, are prime candidates for using PACS to diagnose and treat existing problems, for filtering operations or to conduct research.

I claim:
1. An unmanned aerial vehicle (UAV) pin array release and capture chamber system comprising:
   a chamber assembly comprising:
      two substantially parallel plates of pin arrays,
      each pin array having a plurality of pins that extend and retract through the respective plate substantially perpendicular to the respective plate,
      the two pin arrays arranged vertically opposite each other with a space between the two pin arrays,
      wherein the pins of a first pin array of the two pin arrays and the pins of a second pin array of the two pin arrays extend toward each other in an extended state and retract away from each other in a retracted state, and
      wherein the space is enclosed by two vertical sides and two horizontal sides; and a UAV,
- wherein the space is sized so as to receive the UAV,
- wherein the two pin arrays are sized such that in the extended state more than one of the pins of each pin array comes into contact with the body of the UAV.

2. The UAV pin array release and capture chamber system of claim 1, the chamber assembly further comprising two pin array chamber enclosures, each pin array chamber enclosure associated with one of the two pin arrays and into which the pins of the associated pin array are retracted in the retracted state.

3. The UAV pin array release and capture chamber system of claim 1, wherein the chamber assembly is attached to a moving object.

4. The UAV pin array release and capture chamber system of claim 3, wherein the moving object is an aircraft.

5. The UAV pin array release and capture chamber system of claim 1, wherein the chamber assembly is stationary with respect to a ground surface.

* * * * *